United States Patent Office 3,179,668
Patented Apr. 20, 1965

3,179,668
N-VINYL AMIDINES
Otto von Schickh and Matthias Seefelder, Ludwigshafen (Rhine), Germany, assignors to Badische Anilin- & Soda-Fabrik Aktiengesellschaft, Ludwigshafen (Rhine), Germany
No Drawing. Filed Oct. 22, 1962, Ser. No. 232,301
Claims priority, application Germany, Oct. 25, 1961, B 64,521; Mar. 17, 1962, B 66,414
9 Claims. (Cl. 260—309.6)

This invention relates to the production of N-vinylamidines by reacting amidines with acetylene. Furthermore, the invention relates to the new N-vinylamidines themselves.

It is known that certain organic nitrogen compounds which contain at least one hydrogen atom attached to a nitrogen atom, can be converted to vinyl compounds by reacting them with acetylene. Up to now, however, this reaction has been available only for those nitrogen compounds in which the nitrogen has been rendered strongly negative by the presence of 2 double bonds, 2 aromatic radicals, or by other appropriate means. For example, pyrrole or imidazole and compounds which contain a pyrrole or imidazole ring can be converted to vinyl compounds. Diarylamines, such as diphenylamine, can also be converted to the corresponding N-vinyl compounds. Furthermore, it is possible to convert carboxylic or sulfonic acid amides by means of acetylene to the corresponding N-vinylated acid amides.

On the other hand, nitrogen compounds which do not contain negative nitrogen atoms, i.e., are strongly basic, react in a different manner under similar conditions. For instance, instead of the expected vinylamines from ammonia and acetylene, 2-methyl-5-ethylpyridine is obtained. It has been originally supposed that primary aliphatic or cycloaliphatic amines, such as butylamine and cyclohexylamine, could be vinylated. It has recently been established, however, that not vinylamines but ethylidenimines are obtained as a result of a shift of the double bond:

$$C_4H_9 \cdot NH_2 + CH \equiv CH \rightarrow C_4H_9 \cdot N = CH - CH_3$$

On reacting dialkylamines with acetylene in the presence of heavy metal acetylides, 3-dialkylamino-butines-(1) are formed via the hypothetical intermediate vinylamine stage:

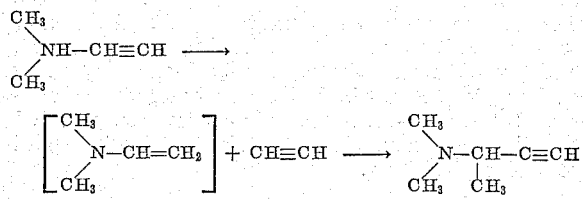

It is an object of the invention to provide a process by which strongly basic amidines can be vinylated by reacting them with acetylene. Another object of the invention is the new N-vinylamidines themselves. Further objects and advantages will become apparent from the following description.

In accordance with this invention, these objects and advantages are achieved and new N-vinylamidines of the Formula I:

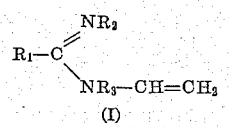

are obtained by reacting amidines of the Formula II:

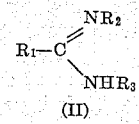

with acetylene at elevated temperatures and pressures in the presence of vinylating catalysts.

In the Formulae I and II, $R_1$ represents hydrogen or a hydrocarbon radical, while $R_2$ and $R_3$ can stand either for hydrocarbon radicals or common members of a heterocyclic ring which includes the two nitrogen atoms and the carbon atom to which these latter are attached.

It was surprising that the starting materials in the process could be vinylated, since they are comparatively strong bases. In an aqueous medium, they have a pH value of 12, i.e., they possess a similar basicity to those nitrogen bases already mentioned which cannot be vinylated. Those nitrogen compounds, whose N-vinyl derivatives have so far been capable of being prepared exhibit, on the other hand, a neutral, or at the most a weakly alkaline reaction in an aqueous medium. For example, an aqueous solution of imidazole has a pH value of 9.

In the preferred compounds covered by Formulae I and II, $R_1$ represents hydrogen or a hydrocarbon radical with from 1 to 17 carbon atoms. In the preferred compounds covered by Formulae I and II, $R_2$ and $R_3$ stand for hydrocarbon radicals with from 1 to 8 carbon atoms or, together, denote an alkylene radical with from 2 to 6 carbon atoms, which links the two nitrogen atoms, and the carbon atom to which those are attached, to form a 5- to 7-membered heterocyclic ring.

The following are examples of starting materials covered by Formula II: 2-methyl-2-imidazoline, 2-isopropyl-2-imidazoline, 2-butyl-2-imidazoline, 2,4-dimethyl-2-imidazoline, 2,3,5-trimethyl-2-imidazoline, 2-heptadecyl-2-imidazoline, 2-cyclohexyl-4-methyl-2-imidazoline, 2-phenyl-2-imidazoline, 2-benzyl-2-imidazoline, 2-β-phenylethyl-2-imidazoline, 2-benzyl-3,4,5,6-tetrahydropyrimidine, 2-methyl-3,4,5,6-tetrahydropyrimidine, 2-methyl-4-hexadecyl-2-imidazoline, 2-methyl-4-phenyl-2-imidazoline, 4,5-tetramethylene-2-imidazoline, 2-methyl-1,3-diazacyclo-heptene-(1), N,N'-dimethylformamidine, N,N'-dipropylformamidine, N,N' - diisobutylformamidine, N,N' - diphenylformamidine, N,N'-dimethylacetamidine, N,N'-dimethylpropionamidine, N,N'-dimethylstearylamidine, N,N'-diethylbenzamidine, N,N'-diethylhexahydrobenzamidine and N,N'-diphenyl-phenylacetamidine.

The starting substances of type II are known from the literature. For example, those with open-chains can be prepared by reacting imido ethers with primary amines. The cyclic substances of type II can be obtained by the acid catalysed splitting off of a carboxylic acid molecule from N,N'-diacylated 1,2-, 1,3- or 1,4-diamines.

The present invention does not reside in the method of carrying out the reaction. The conventional vinylation conditions operate in this process. Examples of the catalysts employed include alkali or alkaline earth metals or oxides, hydroxides or alcoholates thereof; zinc or cadmium salts of organic acids are also suitable as catalysts. The catalysts are employed in the usual amounts, i.e., in general 0.5 to 15% weight referred to starting material II. A suitable reaction temperature lies between 70° and 200° C., preferably between 100° and 180° C. As a rule, the pressure applied lies between 1.5 and 35 atmospheres. It is recommended that an inert gas, such as nitrogen, be coemployed, since, as is well-known, the danger of a possibly explosive decomposition of acetylene can be suppressed thereby. Suitable inert solvents, appropriate quantities of which lie between 50 and 500% weight referred to the amidine II, include, amongst others, benzene, toluene, xylene, cyclohexane, and tetrahydrofuran.

The reaction mixture is worked up in the normal manner, i.e., generally by distillation.

The new heterocyclic N-vinyl compounds obtained by the process are valuable intermediates for the manufacture of reactive dyes. They are, however, of particular significance in the manufacture of copolymers which are suitable for sizing paper. This is particularly true of the N-vinylated cyclic amidines of type I which contain an imidazoline ring. In the manufacture of sizing agents for paper, the materials I are first converted to quaternary substances and these products are copolymerized with acrylic acid esters and, if desired, with acrylonitrile, in an aqueous medium. The disperse cationic copolymer can then be used for the sizing of paper.

The parts specified in the following examples are by weight, and these are related to parts by volume as g. to cc.

*Example 1*

470 parts 2-methylimidazoline is dissolved in 1150 parts by volume toluene. 16.8 parts potassium is added, with stirring, at the reflux temperature. When all the potassium has been dissolved, the suspension obtained is transferred to a pressure vessel. The vessel is pressured to 5 atm. gauge with nitrogen and then to 15 atm. gauge with acetylene, whereupon the mixture is heated to 120° C. The pressure is maintained at 25 atm. gauge by forcing in further acetylene. The absorption of the acetylene is completed after 12 hours. The mixture is allowed to cool, the pressure in the vessel released, and the reaction product is distilled. After distilling off the toluene, 528 parts 1-vinyl-2-methyl-2-imidazoline, B.P. 83° to 86° C. at 20 mm. Hg, is obtained. The yield is 86% of the theory.

*Example 2*

8 parts metallic potassium is dissolved in a hot solution of 3,4,5,6-tetrahydropyrimidine in 1000 parts dry toluene. The resulting suspension is fed into a pressure vessel, and nitrogen at a pressure of 5 atm. gauge is applied; the vessel is heated to 125° C. The pressure is then increased to 25 atm. gauge by forcing in acetylene, and this is maintained until acetylene absorption has been completed. After distilling off the toluene, 253 parts vinyl-tetrahydropyrimidine, B.P. 95° to 98° C. at 89 mm. Hg, iodine number 227 (the theoretical iodine number is 230), is obtained. The yield is 89% of the theory.

*Example 3*

Using the procedure described in Example 2, an equivalent amount of 2-imidazoline is reacted, and 201 parts 1-vinyl-2-imidazoline, B.P. 79° to 80° C. at 20 mm. Hg, iodine number 259 (the theoretical iodine number is 264), is obtained. The yield is 82% of the theory.

*Examples 4 to 8*

The conditions given under Example 1 are employed, but the starting materials and the reaction temperatures are varied. These, together with the results obtained, can be seen from the following table:

| Example | Starting material | Reaction temperature (° C.) | Boiling point | Reaction product | Yield (percent of the theory) |
| --- | --- | --- | --- | --- | --- |
| 4 | 2-ethyl-2-imidazoline. | 120 | 81–84° C./12 mm. Hg. | 2-ethyl-1-vinyl-2-imidazoline. | 74 |
| 5 | 2-propyl-2-imidazoline. | 125 | 98–100° C./12 mm. Hg. | 2-propyl-1-vinyl-2-imidazoline. | 60 |
| 6 | 2-isopropyl-2-imidazoline. | 170 | 95–97° C./15 mm. Hg. | 2-isopropyl-1-vinyl-2-imidazoline. | 55 |
| 7 | 2-phenyl-2-imidazoline. | 130 | 103–105° C./0.3 mm. Hg. | 2-phenyl-1-vinyl-2-imidazoline. | 64 |
| 8 | 2-benzyl-2-imidazoline. | 150 | 124–125° C./0.5 mm. Hg. | 2-benzyl-1-vinyl-2-imidazoline. | 60 |

*Example 9*

1.5 part metallic potassium is added to a boiling solution of 51 parts 2,4-dimethyl-2-imidazoline in 800 parts by volume toluene, the mixture being heated until the potassium dissolves. The solution is transferred to a pressure vessel. The vessel is pressured to 5 atm. gauge with nitrogen and then to 15 atm. with acetylene. The vessel is heated to 125° C. By forcing in further acetylene, the pressure in the vessel is maintained at 25 atm. When no more acetylene is absorbed, the reaction mixture is allowed to cool and then distilled under reduced pressure. 41 parts 1-vinyl-2,4-dimethyl-2-imidazoline, B.P. 81° to 85° C. at 15 mm. Hg, is obtained. The iodine number is 198 (calculated value 204).

*Example 10*

A solution of 33.5 parts 2-methyl-2-imidazoline in 120 parts by volume toluene is reacted with 3.4 parts potassium tert.-butylate, the solution then being treated as in Example 9. 1-vinyl-2-methyl-2-imidazoline is obtained in a yield of 55% of the theory.

If a similar quantity of zinc stearate is substituted for potassium tert.-butylate, the 1-vinyl-2-methyl-2-imidazoline is obtained in a 40% yield. On using the same quantity of metallic calcium as the vinylation catalyst, the yield obtained is only 5% of the theory.

*Example 11*

420 parts 2-methyl-2-imidazoline is reacted with 6.3 parts metallic potassium in a pressure vessel which has heating and cooling equipment. The mixture is heated for 3 hours at temperature of 120° C., and nitrogen and acetylene are then passed in, each at a pressure of 5 atm. The pressure is maintained constant by the admission of further acetylene until the reaction has been completed. The temperature is kept between 115° and 120° C. by cooling when necessary. On distilling under reduced pressure, 500 parts 1-vinyl-2-methyl-2-imidazoline, B.P. 83° to 86° C. (20 mm. Hg), is obtained. This is a yield of 90% of the theory.

*Example 12*

To 156 parts N,N'-diisobutylformamidine dissolved in 1000 parts toluene, is added, with stirring, 4.2 parts potassium at 110° C. After the potassium has been completely dissolved, the solution is transferred to a pressure vessel and a mixture of 1 part by volume nitrogen and 2 parts by volume acetylene is forced in at 140° C. until the pressure attained is 15 atm. The pressure is maintained by continuously passing in further acetylene. After absorption of the acetylene has ceased, the toluene is distilled off, and the N-vinyl-N,N'-diisobutylformamidine is recovered by distillation in vacuo. 113 parts of this substance, B.P. 90° to 92° C. at 12 mm. Hg, iodine number 135 (theoretical value 140), is obtained. The yield is 62% of the theory referred to the weight of N,N'-diisobutylformamidine employed.

If N,N'-diisobutylformamidine is replaced by N,N'-dipropylformamidine and the same procedure used, an N-vinyl-N,N'-dipropylformamidine, B.P. 72° C. at 8 mm. Hg, iodine number 160 (theoretical value 165), is obtained.

*Example 13*

80 parts N,N'-dimethylformamidine, 2.6 parts potassium and 800 parts benzene, are heated in a pressure vessel for 2 hours at 140° C., continuous stirring being applied. A mixture of 1 part by volume nitrogen and 4 parts by volume acetylene is forced in under pressure until the pressure in the vessel reaches 25 atm.; the supply of acetylene is continued so as to maintain the pressure constant. After cooling, the benzene is distilled off and the residue fractionated. 79 parts N-vinyl-N,N'-dimethylformamidine, B.P. 132° C. at 760 mm. Hg, iodine number 254 (theoretically 259), is obtained. The yield is 73% of the theory referred to the N,N'-dimethylformamidine.

If the N,N'-dimethylformamidine is replaced by N,N'-diphenylformamidine, N - vinyl - N,N' - diphenylformamidine, B.P. 141° to 143° C. at 0.2 mm. Hg, iodine number 118 (theoretically 113), is obtained.

*Example 14*

135 parts N,N'-dimethyl-acetamidine is dissolved in 1000 parts toluene, 5 parts potassium metal is added, and the mixture is heated in a pressure vessel at 175° C. for 2 hours. A mixture of 1 part by volume nitrogen and 4 parts by volume acetylene is then forced in under pressure, and the supply of acetylene continued until the pressure remains constant. After this, the toluene is distilled off and the residue is fractionated in vacuo. 76 parts N'-vinyl-N,N'-dimethylacetamidine, B.P. 90° to 93° C. at 61 mm. Hg, is obtained.

*Example 15*

126 parts water is fed into a reaction vessel which can be cooled and contains a stirrer and an internal thermometer, and has two feeder tanks connected with it. The one tank contains 110 parts 1-vinyl-2-methyl-2-imidazoline, and the other 127 parts dimethyl sulfate. These two substances are then allowed to flow into the reaction vessel within about 1 hour during which time the mixture is vigorously stirred and cooling is applied when necessary so that the temperature does not rise above 30° C. The reaction is then allowed to continue for 2 hours and the pH of the solution is adjusted to a value of 6 by adding some ammonia. The solution is yellowish in color and contains 50% quaternary salt.

16 parts of the 50% 1-vinyl-2,3-dimethylimidazolinium methyl sulfate solution, 1 part diethyldodecyl ammonium sulfate and 2 parts polyvinyl pyrrolidone are fed into a polymerization vessel equipped with stirrer, feeder vessel, reflux condenser and a thermometer, and the mixture is heated to 85° C. 2 parts 30% hydrogen peroxide is then added, whereupon a mixture of 70 parts butyl acrylate and 30 parts acrylonitrile is allowed to flow in over a period of 2 hours during which time the temperature is maintained at between 85° to 90° C. The reaction mixture is kept at this temperature for a further 2 hours and is then cooled. The finely divided dispersion is then adjusted to a solids content of 35% by adding water.

Unsized paper is sized by immersing it for 10 seconds in a 1% weight aqueous dispersion of the copolymer described, the application liquor being prepared by appropriately dilution the 35 weight percent standard solution.

We claim:
1. A compound of the formula

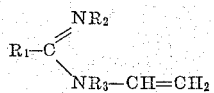

wherein
$R_1$ represents a member selected from the group consisting of hydrogen, alkyl, cycloalkyl, aryl and aralkyl of up to 17 carbon atoms and
$R_2$ and $R_3$ represent a member selected from the group consisting of alkyl, cycloalkyl and aryl of up to 8 carbon atoms and further members in which $R_2$ and $R_3$ when taken together denote alkylene of 2 to 6 carbon atoms which combines the two nitrogen atoms and the carbon atom to which said nitrogen atoms are attached to form a 5- to 7-membered ring.

2. A compound of the formula

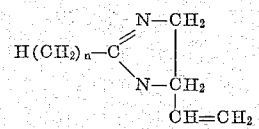

wherein $n$ is an integar of from 1 to 17.

3. 1-vinyl-2-methyl-2-imidazoline.

4. A process for the production of an N-vinylamidine of the formula

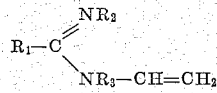

wherein
$R_1$ represents a member selected from the group consisting of hydrogen, alkyl, cycloalkyl, aryl and aralkyl of up to 17 carbon atoms and
$R_2$ and $R_3$ represent a member selected from the group consisting of alkyl, cycloalkyl and aryl of up to 8 carbon atoms and further members in which $R_2$ and $R_3$ when taken together denote alkylene of 2 to 6 carbon atoms which combines the two nitrogen atoms and the carbon atom to which said nitrogen atoms are attached to form a 5- to 7-membered ring, said process comprising: reacting an amidine of the formula

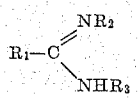

wherein $R_1$, $R_2$ and $R_3$ have the meanings given above, at an elevated temperature and pressure with acetylene in the presence of a vinylating catalyst.

5. A process as claimed in claim 4 wherein said reaction is carried out in an inert solvent.

6. A process as claimed in claim 4 wherein said reaction is carried out at a temperature of about 70° C. to 200° C., under a pressure of about 1.5 to 35 atmospheres and in the presence of a vinylating catalyst selected from the group consisting of alkali and alkaline earth metals, their oxides, hydroxides and alcoholates, and zinc and cadmium salts of organic acids.

7. A process as claimed in claim 6 wherein said reaction is carried out at a temperature of about 100° C. to 180° C.

8. A process as claimed in claim 6 wherein a 2-alkyl-2-imidazoline is reacted with acetylene to form the corresponding 1-vinyl-2-alkyl-2-imidadoline.

9. A process as claimed in claim 6 wherein 2-methyl-2-imidazoline is reacted with acetylene to form 1-vinyl-2-methyl-2-imidazoline.

References Cited by the Examiner

Raphael: Acetylenic Compounds in Organic Synthesis (1955), page 39.

IRVING MARCUS, *Primary Examiner.*

NICHOLAS S. RIZZO, *Examiner.*